Jan. 9, 1951 W. E. CAMPBELL 2,537,329
METHOD OF PRODUCING MAPS
Filed Oct. 8, 1945
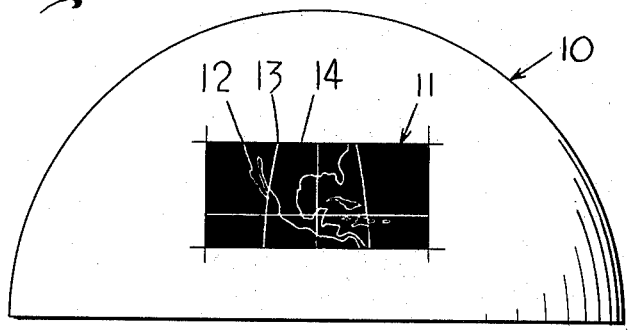
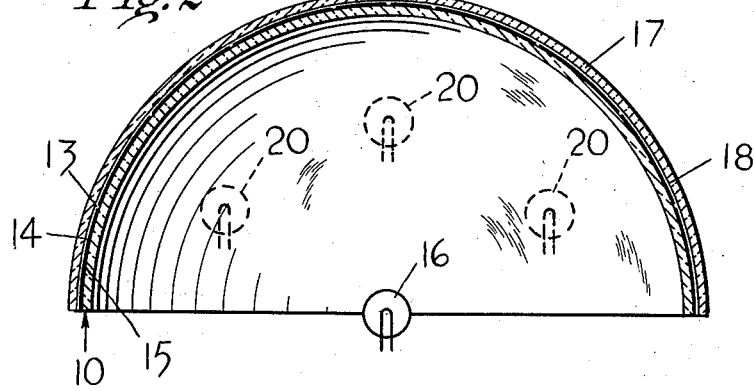
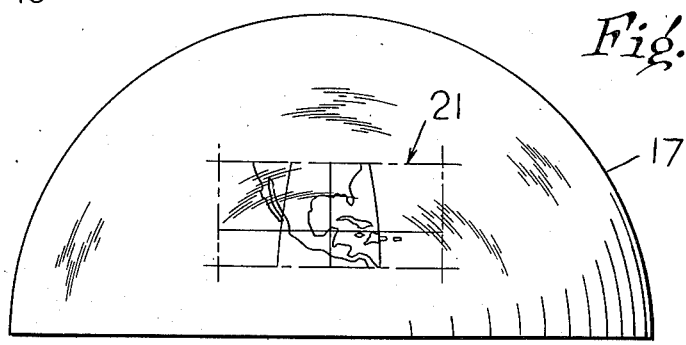
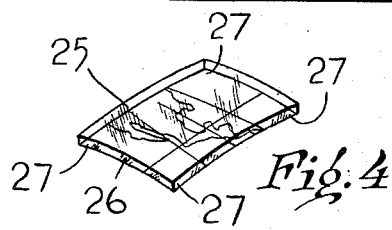
Inventor
William E. Campbell
By Cushman, Darby & Cushman
Attorneys Patented Jan. 9, 1951

2,537,329

UNITED STATES PATENT OFFICE 2,537,329

METHOD OF PRODUCING MAPS

William E. Campbell, Bridgeport, Pa.

Application October 8, 1945, Serial No. 620,888

3 Claims. (Cl. 95—5)

The present invention relates to maps and methods of producing maps.

Throughout the following specification and claims, the term "map" is intended to include maps in globe form, or portions of a globe.

Prior methods of producing maps which conform to the curvature of the earth, for example, globe maps, are unsatisfactory because of the expensive and time consuming procedure which is involved. In order to produce a globe, it has been necessary to print geographical indicia on paper which is then cut into segments for application to a blank globe. Because the paper is flat, the segments must be very carefully and exactly stretched and fitted together in order to provide satisfactory results. The high degree of skill necessary in fitting the segments to the blank globe renders this procedure almost prohibitive in cost. One result is that few educational institutions have satisfactory globes for class-work. Such globes as are available are usually extremely small, the small globes being the only ones which are obtainable at a reasonable price. Small globes are generally unsatisfactory and the inaccuracies which develop during their production further decrease their value.

An important object of the present invention is to provide a map which will be of curvilinear formation and which can be readily and economically produced.

Another object of the invention is to provide a method of producing curvilinear and flat maps which is extremely efficient and involves a minimum of apparatus and operations.

A further object of the invention is to provide a map which has the geographical indicia applied thereto at such points that it cannot readily be obliterated or marred.

A still further object of the invention is to provide a map which is of such construction that markings may be applied thereto and readily removed without affecting the geographical indicia.

Other objects and advantages of the invention will be apparent from the following specification and accompanying drawing wherein—

Figure 1 is a diagrammatic elevation of a matrix or negative used in the process of the present invention, Figure 2 is a view illustrating the manner of carrying out the process, Figure 3 is a diagrammatic elevation of a hemisphere produced by the method of the present invention, and Figure 4 is a perspective view of a map of rectangular outline and curvilinear formation included in the present invention.

According to the method of the present invention, a matrix designated by the numeral 10 and illustrated in Figure 1 is first provided. Assuming that the map to be formed is to be a globe, two matrices such as 10 will be produced, one to correspond to each hemisphere of the earth. Each matrix 10 will be formed of readily moldable transparent material, such as polymethyl methacrylate and will be hollow. The matrix 10 may have its walls of suitable thickness to prevent breakage but without resulting in distortion of light passing therethrough. A matrix such as 10 can be readily molded if a material such as that mentioned is used.

An opaque coating such as indicated at 14 will then be applied to the entire exterior or convex surface of the matrix. This entire coating will later be marked as illustrated over the area 11 in Figure 1. As a result, the matrix becomes a negative transparency. More particularly, geographical indicia, such as boundary outlines 12 and latitude and longitude lines 13 will be drawn in the coating 14 so that the matrix will be transparent, or at least translucent, along these lines, while intervening areas will be left coated or opaque. Such lettering as is necessary will also be transparent. It will be observed that the negative map formed on matrix 10 does not read in reverse and, therefore, can be readily scribed or drawn in the opaque coating.

Figure 2 illustrates the matrix 10 in cross section with latitude and longitude lines 13 indicated as uncoated or transparent, whereas the intervening portions of coating 14 form masked areas as indicated at 15. The coating 14 is preferably applied to the convex or outer surface of the matrix 10, primarily because the draftsman or cartographer can more readily work upon this surface. In addition application of the mask to the convex surface eliminates all possibility of error in the final product for reasons hereinafter set forth.

When application of the desired indicia to the matrix 10 has been completed, it is placed in front of or over a source of light such as generally indicated at 16 and a map element 17 is superimposed upon the matrix 10. The map element 17 is also formed of transparent material but its concave or inner face has a light-sensitive coating 18 applied thereto. It will be observed that if the element 17 is formed of a readily moldable plastic such as polymethyl methacrylate, it can be produced at comparatively low cost.

Figure 2 illustrates the printing step of the present process and it will be observed that the masked areas 15 on the matrix 10 will prevent passage of light from source 16, while at the unmasked areas, such as 12 and 13, light may act upon the photosensitive surface 18. Figure 2 shows the light source positioned at a central point within the matrix 10 but it will be understood that the source of light may be positioned closer to the concave surface of the matrix, for example, by providing batteries of lamps within the matrix and closer to its surface then illustrated. Such an arrangement is indicated in dotted lines at 20 in Figure 2. In any event, by having a single central light source such as indicated at 16, or by having a plurality of light sources such as indicated at 20, the entire area of the light-sensitive surface 18 will be uniformly exposed because the light source or sources are equidistantly positioned along lines extending radially of the area of the matrix. Because the mask 15 and the sensitized surface 18 are not separated by a layer of the plastic material, the portions of 18 sensitized by the light will be an accurate representation of the indicia applied to the matrix. Hence, slight optical flaws in the matrix are of no importance.

After the map element has been exposed to light as described above, the light-sensitive coating 18 may be developed by any usual process so that the latent image formed by the light will appear thereon as geographical indicia as shown in Figure 3.

Matrix 10, when once marked, may be used to produce identical maps for an indefinite period and at very small cost.

The resulting map element 17 formed by the apparatus and method illustrated in Figures 1 and 2 is shown in Figure 3. In this case, the map element 17 is a hemisphere and the geographic indicia which appear thereon are generally designated by the numeral 21. Naturally, two hemispheric matrices will be provided to produce a complete globe. Because the element 17 is of transparent material, these indicia are readily observable although they are on the inner or concave surface of the hemisphere. Positioning the indicia on the inner surface of the hemisphere prevents them from being marred during use of the globe. In addition, with the convex surface of proper finish, any desired markings such as necessary in class room work or for reference can be applied to that surface without affecting the markings 21. Corrections can be applied in the same manner. Also, any temporary markings applied to the outer surface readily can be removed without damaging the permanent markings 21.

Figure 4 illustrates a curvilinear map 25 of rectangular outline such as may be produced by the present invention. This map is also formed of transparent material but is curvilinear preferably to conform to the surface of the earth, and on any desired scale. The manner of producing such a map by the process described above will be obvious. That is, if a map on the same scale as the matrix 10 is desired, a curvilinear element of the outline of the matrix 10 and having its concave surface coated with light-sensitive material may be applied to the portion of matrix 10 which is to be produced. Thus, the completed map 25 will have geographical indicia on its concave or under surface 26, leaving its convex surface clear for reference markings. If desired, the matrix also may be rectangular in outline.

Because map 25 is curvilinear, it will show the true curvature of the earth, a fact which is of value in class-work. In addition, its curvilinear or concavo-convex formation will cause it to rest upon the lower edges 27 of its corners when placed upon a table or wall. As a result, the markings on its concave surface will be spaced from the table or wall and will not be scratched.

The terminology used in the specification is for the purpose of description and not of limitation, the scope of the invention being indicated in the following claims.

I claim:

1. The method of producing a transparent globe-map section, comprising providing a hemispherical matrix which is formed of transparent material having an opaque outer convex surface, forming the desired map markings on said surface so that light may pass through the matrix only at the markings, positioning upon the outer surface of the matrix a hemispherical map blank formed of transparent material having a light-sensitized inner concave surface, so that the sensitized surface of the blank will be immediately adjacent the marked surface of the matrix, projecting light from a point inwardly of the matrix and upon the sensitized surface of the map blank to produce a latent image on the sensitized surface, and then developing the sensitized surface to produce therein a visible facsimile of the matrix image.

2. The method of preparing a geographical globe, which consists in applying a photosensitive film to the inner surface of a hemispherical transparent shell, applying to the complementary surface of a nesting transparent matrix shell a map with areas of distributed opacity and transparency, nesting said shells to bring the map into contact with the sensitized film and exposing the latter to light passed through said matrix, and thereupon developing the exposed film.

3. The method of producing a transparent globe-map section, comprising providing a hemispherical matrix which is formed of transparent material having an opaque outer convex surface, forming the desired map markings on said surface so that light may pass through the matrix only at the markings, positioning upon the outer surface of the matrix a hemispherical map blank formed of transparent material having a light-sensitized inner concave surface, so that the sensitized surface of the blank will be immediately adjacent the marked surface of the matrix, projecting light from a point inwardly of the matrix and upon the sensitized surface of the map blank, and then treating the sensitized surface to produce therein a visible facsimile of the matrix image.

WILLIAM E. CAMPBELL.

REFERENCES CITED

The following references are of record in the file of this patent:

UNITED STATES PATENTS

| Number | Name | Date |
|---|---|---|
| 135,315 | Boucher | Jan. 28, 1873 |
| 253,864 | Hays | Feb. 21, 1882 |
| 441,086 | Dobinson | Nov. 18, 1890 |
| 887,740 | Phillips | May 12, 1908 |
| 888,854 | Sheldon | May 26, 1908 |
| 1,422,642 | Walters | July 11, 1922 |
| 1,630,916 | Wittenberg | May 31, 1927 |
| 2,083,988 | Dupler | June 15, 1937 |
| 2,204,147 | Murray | June 11, 1940 |
| 2,223,341 | Ernst et al. | Dec. 3, 1940 |
| 2,290,478 | Matlas | July 21, 1942 |
| 2,294,276 | Callinicos | Aug. 25, 1942 |
| 2,333,251 | Huggins | Nov. 2, 1943 |
| 2,335,742 | Creance | Nov. 30, 1943 |
| 2,379,468 | Arnold | July 3, 1945 |
| 2,491,386 | Miller | Dec. 13, 1949 |

FOREIGN PATENTS

| Number | Country | Date |
|---|---|---|
| 1,089 | Great Britain | May 1, 1861 |
| 29,605 | Great Britain | of 1904 |
| 110,181 | Great Britain | of 1917 |